United States Patent [19]

Ishikawa et al.

[11] Patent Number: 4,707,799

[45] Date of Patent: Nov. 17, 1987

[54] BIT SLICED DECIMAL ADDING/SUBTRACTING UNIT FOR MULTI-DIGIT DECIMAL ADDITION AND SUBTRACTION

[75] Inventors: Tadashi Ishikawa; Kazutoshi Eguchi, both of Tokyo, Japan

[73] Assignee: Kabushiki Kaisha Toshiba, Kawasaki, Japan

[21] Appl. No.: 695,346

[22] Filed: Jan. 28, 1985

[30] Foreign Application Priority Data

Jan. 30, 1984 [JP] Japan .................................. 59-14708
Jan. 30, 1984 [JP] Japan .................................. 59-14709

[51] Int. Cl.$^4$ ............................................... G06F 7/50
[52] U.S. Cl. ..................................... 364/771; 364/749
[58] Field of Search ................ 364/771, 772, 783, 749

[56] References Cited

U.S. PATENT DOCUMENTS 3,991,307 11/1976 Peddle et al. ........................ 364/771
4,245,328 1/1981 Negi et al. ............................ 364/771
4,441,159 4/1984 Hart .................................... 364/771

OTHER PUBLICATIONS

Schmookler et al., "Decimal Adder", *IBM Tech. Disclosure Bulletin*, vol. 12, No. 3, Aug. 1969, pp. 380-381.
Jeremiah, "Hardware Design Enhances Direct Decimal Calculations", *Computer Design*, Jun. 1980, pp. 118-130.

*Primary Examiner*—David H. Malzahn
*Attorney, Agent, or Firm*—Cushman, Darby & Cushman

[57] ABSTRACT

A bit sliced decimal adding/subtracting unit includes an 8-digit decimal adder/subtracter and an offset data generator. In the 8-digit decimal adder/subtracter, eight 1-digit decimal adder/subtracters are intercoupled so as to allow a carry to propagate from the lower order digit to the higher order digit. The offset data generator has first and second logical gates. The first logical gate detects whether or not an addition mode is specified by operation mode data. The second logical gate determines that a signal ZONE representing the format of the data to be operated represents a zone format, and that the addition mode is detected by said first logical gate. The output signal from the first logical gate is used for the first and second bits of the first 4-bit offset data. The output signal from the second logical gate is used for the 0th bit (MSB) and the third bit (LSB) of the first offset data. The output signal from the first logical gate is also used for the first and second bits of second 4-bit offset data. The 0th bit and the third bit of the second offset data are fixed at logical 0. The first offset data is supplied to the offset inputs of the adder/subtracters at the even digits (where the most significant digit is the 0th digit, and the least significant digit is the seventh digit) of the eight 1-digit decimal adder/subtracters. The second offset data is supplied to the offset inputs of the adder/subtracters at the odd number digits of the eight 1-digit decimal adder/subtracters.

5 Claims, 7 Drawing Figures

BIT SLICED DECIMAL ADDING/SUBTRACTING UNIT FOR MULTI-DIGIT DECIMAL ADDITION AND SUBTRACTION

BACKGROUND OF THE INVENTION

The present invention relates to a bit sliced decimal adding/subtracting unit of the type in which n1-digit decimal adder/subtracters are used for n-digit decimal addition and subtraction.

Generally, the expression of decimal numbers is categorized into a pack format and a zone format. In the pack format, one digit consists of 4 bits. The addition and subtraction in the pack format, therefore, could be realized by using merely a single 1-digit decimal adder/subtracter. Actually, however, a multi-digit (e.g. n-digit) decimal adder/subtracter consisting of a plurality of 1-digit decimal adder/subtracters is employed in order to reduce the operating time since the number of digits of an operand is large.

In the zone format, one digit of the decimal number consists of 8 bits (one byte). The lower four bits of each byte are used for expressing a decimal number. The upper four bits of each byte are for designating zone data. Thus, the data format of the zone format is different from that of the pack format. For this reason, to apply the n-digit decimal adder/subtracters to the adding and subtracting of the decimal numbers of the zone type, the operand of the zone type must be changed into the pack type operand. This data format changing is accompanied by complicated procedural steps.

SUMMARY OF THE INVENTION

Accordingly, an object of the present invention is to provide a bit sliced decimal adding/subtracting unit which can perform the operation of the decimal numbers in both the pack and the zone format, without changing the data format.

According to the present invention, there is provided a bit sliced decimal adding/subtracting unit including an n-digit decimal adder/subtracter, and first and second means. The n-digit decimal adder/subtracter includes n1-digit decimal adder/subtracters (n is an even number) each with an offset input. These 1-digit decimal adder/subtracters are interconnected so as to allow a carry to be propagated from the lower order digit to the higher order digit. The first means generates first offset data on the basis of first control data which specifies an operation mode of the n-digit decimal adder/subtracter, and further second control data which indicates if the data format of the data to be operated by the n-digit decimal adder/subtracter is of the pack format or the zone format. The first offset data as generated by the first means is connected to the offset inputs of the adder/subtracters at the even number digits of the n1-digit decimal adder/subtracters. In connection with this, concerning the digits of the adder/subtracter, the most significant digit is defined as the 0th digit, and the least significant digit is defined as the n-1th digit. The second means generates second offset data on the basis of the first control data, and applies it to the offset inputs of the adder/subtracters at odd number digits of the n1-digit decimal adder/subtracters.

DETAILED DESCRIPTION OF THE PREFERRED EMBODIMENTS

Figure 1:
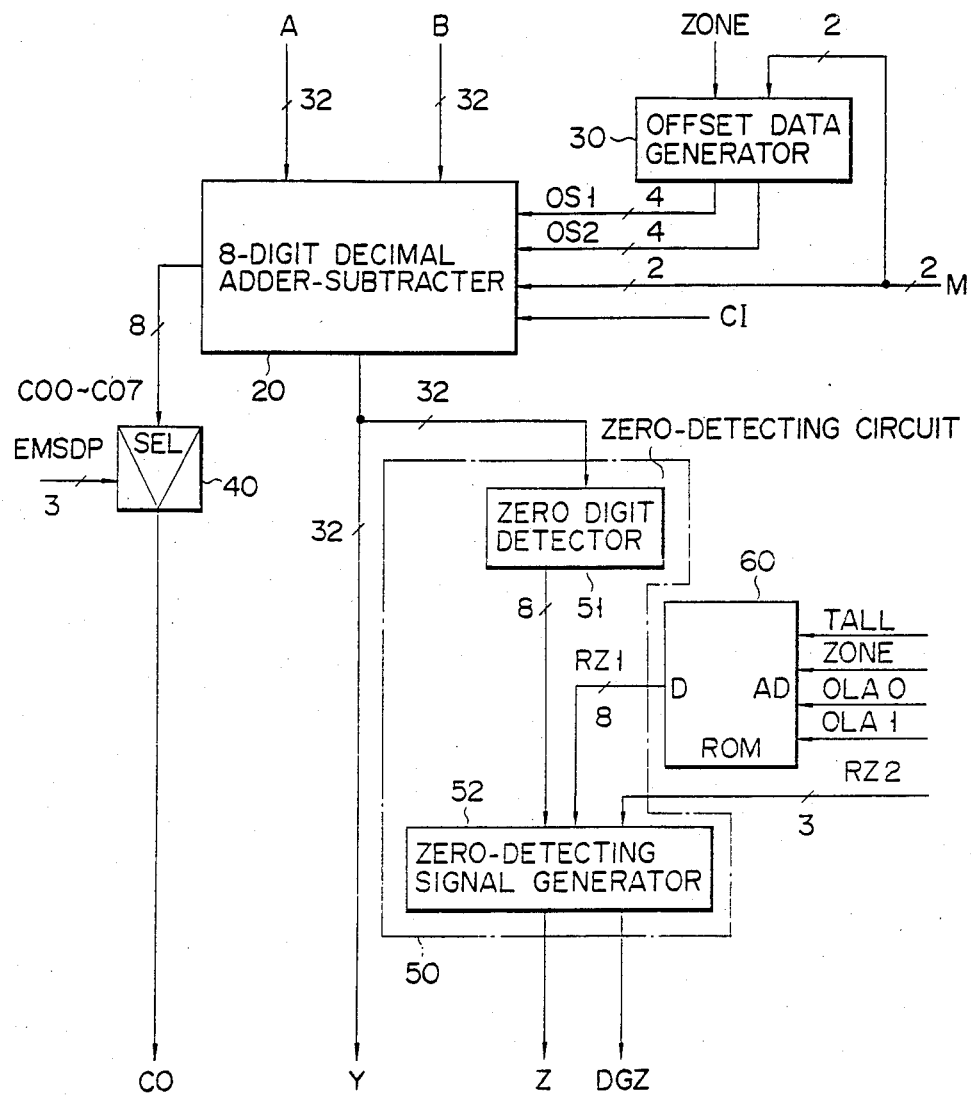
FIG. 1 is a block diagram of a bit sliced decimal adding/subtracting unit which is an embodiment of the present invention.

FIG. 1 shows a bit sliced decimal adding/subtracting unit which is an embodiment of the present invention. It is assumed that the data to be processed by a data processor using the bit sliced decimal adding/subtracting unit shown in FIG. 1 has a 32-bit (4-byte) length. In FIG. 1, an 8-digit decimal adder/subtracter 20, representing the heart of the decimal adding/subtracting unit, is connected for reception to operands A and B each of 32 bits (4 bytes), offset data OS1 and OS2 each of 4 bits, operation mode data M for designating an operation mode, and a carry input CI. The 8-digit decimal adder/subtracter 20 executes the operation of the operands A and B according to the operation mode data M, the offset data OS1 and OS2, the carry input CI, and produces operation result Y of 32 bits and the carry outputs CO0–CO7 at the respective digits.

Figure 2:
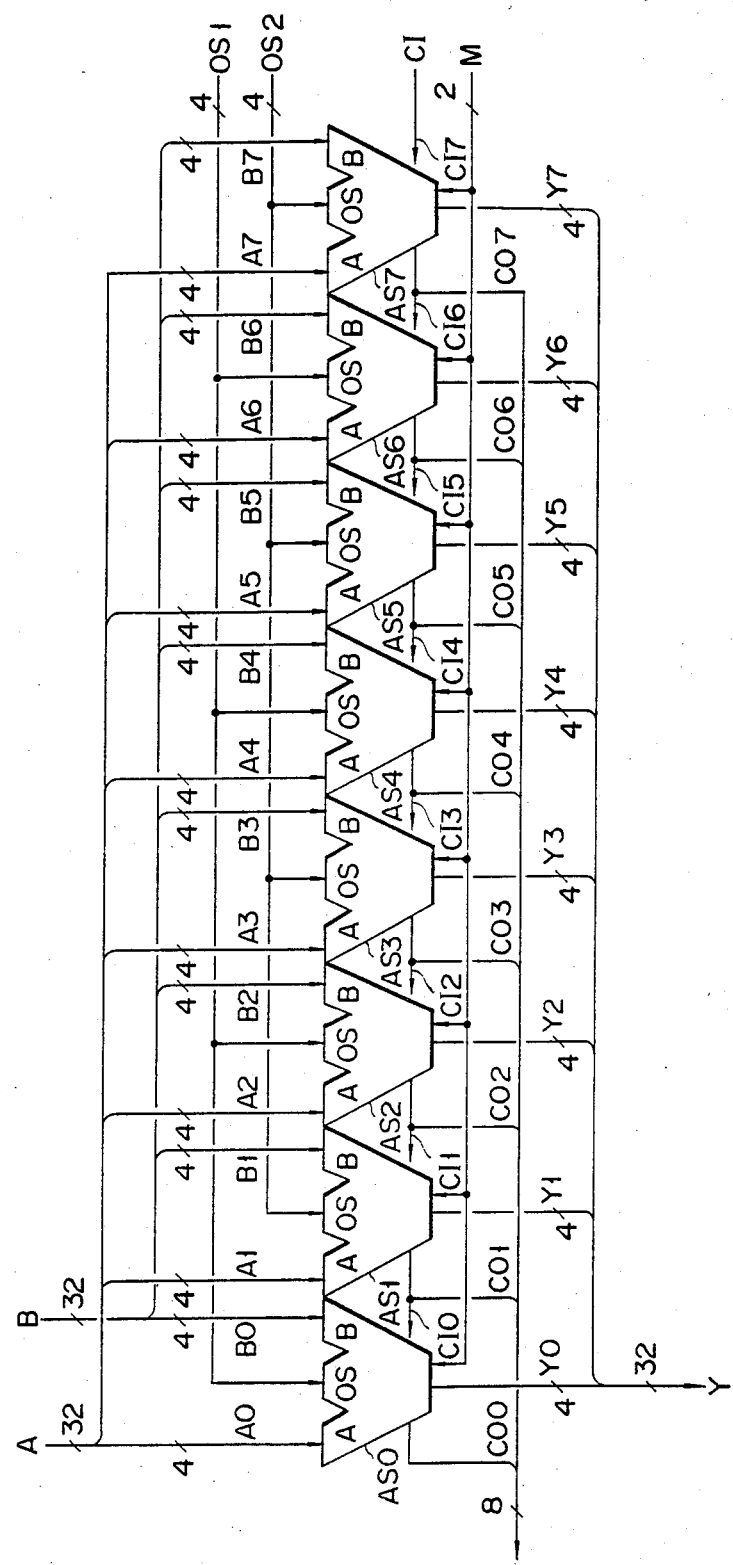
FIG. 2 is a block diagram of an 8-digit decimal adder/subtracter used in the FIG. 1 circuit.

FIG. 2 shows an arrangement of the 8-digit decimal adder/subtracter 20. In FIG. 2, the 8-digit decimal adder/subtracter 20 contains 4-bit 1-digit decimal adder/subtracters AS0–AS7. The adder/subtracter AS0 is used for addition and subtraction of the 0th digit (most significant digit). The adder/subtracter AS1 is used for the addition and subtraction of the first digit. This relationship is correspondingly applied for the remaining adder/subtracters AS2–AS7. For this embodiment, the adder/subtracter AS7 is used for addition and subtraction of the 7th digit (least significant digit). As a generalization, the adder/subtracter ASi (i is any of 0 to 7) is used for addition and subtraction of the ith digit, the adder/subtracters AS0 to AS7 are generally represented by an adder/subtracter ASi (i is any of 0–7).

The operand A consists of eight digits, i.e. the 0th digit A0 (most significant digit), the first digit A1, ..., the seventh digit A7. The operand B also consists of eight digits, the 0th digit B0 (most significant digit), the first digit B1, ..., the seventh digit B7. The 0th digit A0 of the operand A is connected to the input A of the adder/subtracter AS0. The 0th digit B0 of the operand B is connected to the input B of the adder/subtracter AS0. The first digit A1 of the operand A is input to the input A of the adder/subtracter AS1. The first digit B1 of the operand B is connected to the input B of the adder/subtracter AS1. This relationship follows for the remaining digits of the operands A and B, that is, the second digit A2 to the seventh digit A7, and the second digit B2 to the seventh digit B7. For example, the seventh digit A7 of the operand A is supplied to the input A of the adder/subtracter AS7. The seventh digit B7 of the operand B is supplied to the input B of the adder/subtracter AS7. As a generalization, an ith digit Ai (i is any of 0 to 7) of the operand A is input to the input A of an adder/subtracter ASi. The ith digit Bi of the operand B (i is any of 0 to 7) is input to the input B of the adder/subtracter ASi. The offset data OS1 is input to the inputs OS (offset) of the adder/subtracters AS0, AS2, AS4, and AS6 at even number digits. The offset data OS2 is input to the input OS (offset) of the adder/subtracters AS1, AS3, AS5, and AS7 at the odd number digits. The operation mode data M is input to the adder/subtracters AS0 to AS7. The carry input CI0 is supplied to the adder/subtracter AS0. The carry input CI1 is supplied to the adder subtracter AS1. This relationship follows for the carry inputs CI2 to CI7. For example, the carry input CI7 is supplied to the adder/subtracter AS7. A carry input CIi (i is any of 0 to 7) is applied to an adder/subtracter ASi.

The adder/subtracter AS0 executes the operation of the 0th digits A0 and B0 of the operands A and B according to the operation mode data M, the offset data OS1, the carry input CI0, and produces the result of the operation (output) Y0 of 4 bits (one digit) and a carry output CO0. The adder/subtracter AS1 executes the operation of the first digits A1 and B1 of the operands A and B according to the operation mode data M, the offset data OS2, a carry input CI1, and produces the result of the operation (output) Y1 of 4 bits (one digit) and a carry output CO1. The same thing is true for the remaining adder/subtracters AS2 to AS7. For example, the adder/subtracter AS7 executes the operation of the seventh digits A7 and B7 of the operands A and B according to the operation mode data M, the offset data OS2, the carry input CI7, and produces the operation result (output) Y7 of 4 bits (one digit) and a carry output CO7. Generally, the adder/subtracter ASi (i is any of 0-7) executes the operation of the ith digits Ai and Bi of the operands A and B according to the operation mode data M, the offset data OSi, the carry input CIi, and produces the operation result (output) Yi and the carry output COi. Here, the offset data OS1 and OS2 are represented by OS, the operation results Y0 to Y7 by Yi, and the carry outputs CO0 to CO7 by the carry output COi.

In FIG. 2, the carry inputs CI0 to CI6 to the adder/subtracters AS0 to AS6 are the carry outputs CO1 to CO7 from the adder/subtracters AS1 to AS7. Generally, this is expressed such that the carry input CIi to the adder/subtracter ASi (i is any of 0 to 6) is the carry output COi+1 from the adder/subtracter ASi+1 which is by one digit lower in significance than the adder/subtracter ASi. The carry input CI7 to the adder/subtracter AS7 is the carry input CI to the 8-digit decimal adder/subtracter 20. The data obtained by linking the operation results Y0 to Y7 of the adder/subtracters AS0 to AS7 is used as the operation result Y of the 8-digit decimal adder/subtracter 20.

Figure 3:
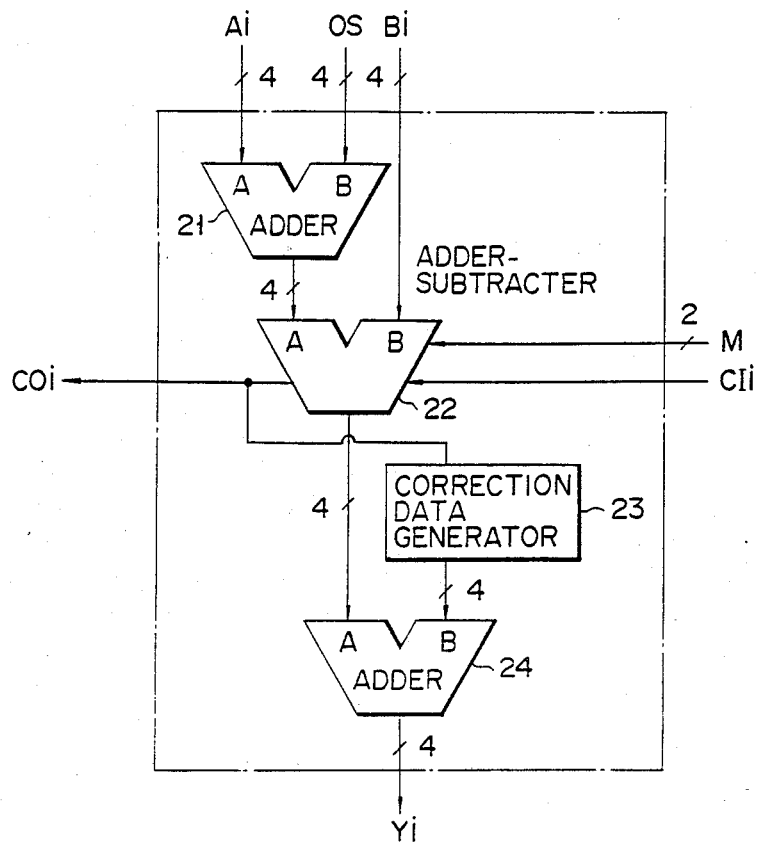
FIG. 3 is a block diagram of a 1-digit decimal adder/subtracter shown in FIG. 2.

FIG. 3 shows a configuration of the adder/subtracters AS0 to AS7, which are represented by a single adder/subtracter ASi (i is any of 0 to 7). In FIG. 3, the ith digit Ai of the operand A is supplied to the input A of a binary 2-bit adder 21, and the offset data OS is connected to the input B of the adder 21. The adder 21 adds the offset data OS to the ith digit Ai of the operand A. The output data from the adder 21 is supplied to the input A of a binary 4-bit adder/subtracter 22. The ith digit Bi of the operand B is supplied to the input B of the adder/subtracter 22. The operation mode data M and the carry input CIi are also supplied to the adder/subtracter 22. The adder/subtracter 22 executes an operation on the output data from the adder 21 and the ith digit Bi of the operand B in accordance with the operation mode data M and with the carry input CIi. The carry output from the adder/subtracter 22 is used as the carry output COi from the adder/subtracter ASi. The carry output (COi) from the adder/subtracter 22 is supplied to a correction data generator 23. The correction data generator 23 generates either of correction data $A_H$ and $O_H$ (H indicates hexadecimal notation) on the basis of the carry output (COi) from the adder/subtracter 22. The output data from the correction data generator 23 is supplied to the input B of a binary 4-bit adder 24. The output data of the adder/subtracter 22 is supplied to the input A of the adder 24. The adder 24 adds the output data (correction data) of the correction data generator 23 to the output data of the adder/subtracter 22. The result of the addition by the adder 24 is used as the operation result Yi by the adder/subtracter Ai.

As shown in FIG. 1, an offset data generator 30 is connected to the 8-digit decimal adder/subtracter 20. The offset data generator 30 is connected for reception to the operation mode data M (2 bits) and the data format designating signal ZONE. The offset data generator 30 generates offset data OS1 and OS2 using the operation mode data M and the data format designating signal ZONE. The operation mode data M designates an addition mode when M=0 ("00"), a subtraction mode when M=1 ("01"), and a left-side-input-through mode when M=2 ("10"). The data format designating signal ZONE indicates whether the operands A and B are of the zone or the pack format. In this embodiment, when ZONE=1, the operands are expressed by the decimal number of the zone format. When ZONE=0, these are expressed by the decimal number of the pack format.

Figure 4:
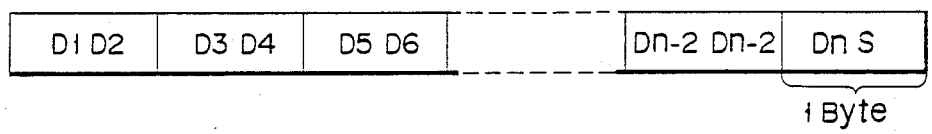
FIG. 4 shows a data format of a pack format decimal number.
Figure 5:
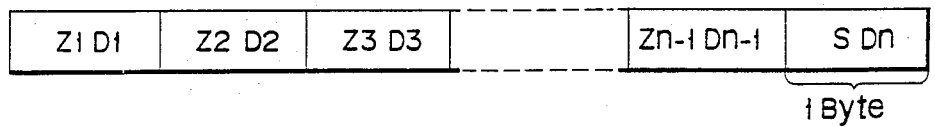
FIG. 5 shows a data format of a zone format decimal number.

FIG. 4 shows a data format of the pack format decimal number. FIG. 5 shows a data format of the zone format decimal number. Each digit of the pack format decimal number consists of 4 bits, as shown in FIG. 4. In the pack format decimal number, the lower 4 bits in the least significant byte designate a sign S. Each digit of the zone format decimal number consists of one byte, as shown in FIG. 5. The lower 4 bits of each byte designate a decimal number. The upper 4 bits designate zone data Zi (i=1−n). In the zone format shown in FIG. 5, the least significant byte is a sign data SDn, i.e., one digit data containing a sign.

Figure 6:
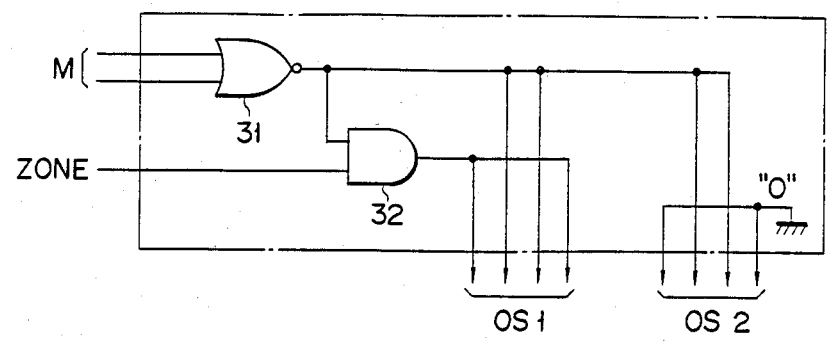
FIG. 6 is a circuit diagram of an offset data generator used in the FIG. 1 circuit.

FIG. 6 shows a circuit arrangement of the offset data generator 30. In FIG. 6, the operation mode data M is supplied to a two-input NOR gate 31. The output signal from the NOR gate 31, together with the signal ZONE, is supplied to a two-input AND gate 32. The output signal from the AND gate 32 is used as bit 0 (most significant digit) of the 4-bit offset data OS1 and the bit 3 (least significant digit) of the same. The output signal from the NOR gate 31 is used as bit 1 and bit 2 of the offset data OS1 and OS2. Bit 0 and bit 3 of the offset data OS2 are always logical 0.

In the bit sliced decimal adding/subtracting unit shown in FIG. 1, a selector 40 is connected to the 8-digit decimal adder/subtracter 20. The selector 40 selects one of the carry outputs CO0 to CO7 at each digit from the 8-digit decimal adder/subtracter 20 in accordance with the 3-bit effective most significant digit position data EMSDP, and produces it as a carry output CO. The digit position data EMSDP designates a digit position of the most significant digit (effective most significant digit) in the effective data of the output data Y from the bit sliced decimal adding/subtracting unit. The digit position data EMSDP consists of signal ZONE (LSB) representing the data format of the operands A and B, and byte position data BPU of 2 bits. The byte position data BPU designates a byte position of the effective most significant digit of the operands A and B. The byte position of the 0th digit and the first digit of the operands A and B is 0 ("00"). The byte position of the second and third digits is 1 ("01"). The byte position of the 4th and 5th digits of the operands A and B is 2 ("10"). The byte position of the 6th and 7th digits is 3 ("11").

In FIG. 1, a zero-detecting circuit 50 is connected to the 8-digit decimal adder/subtracter 20. The zero-detecting circuit 50 includes a zero digit detector 51 for detecting zero at each digit of the operation result Y of the 8-digit decimal adder/subtracter 20, and a zero-detecting signal generator 52 for generating two types of zero detecting signals Z and DGZ.

Figure 7:
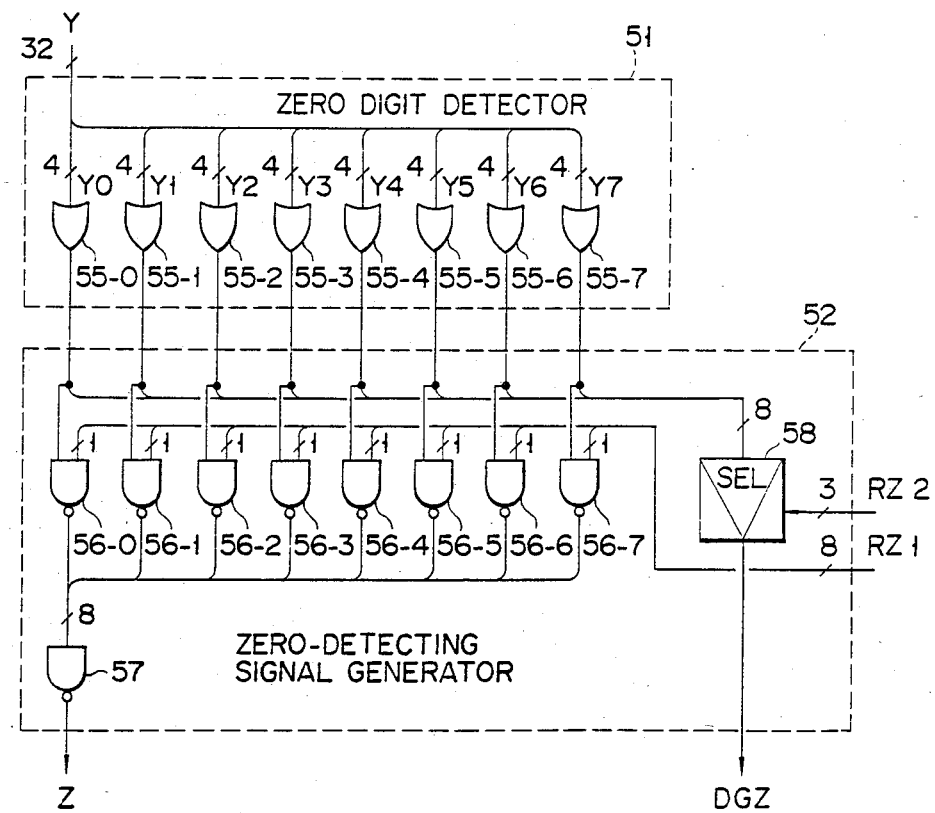
FIG. 7 shows a circuit diagram of a zero-detecting circuit used in the FIG. 1 circuit.

FIG. 7 shows a circuit arrangement of the zero-detecting circuit 50. In the figure, the zero digit detector 51 includes eight 4-input OR gates 55-0 to 55-7. Of the output data Y from the 8-digit decimal adder/subtracter 20, the ith digit data Yi is connected to an OR gate 55-i (i is any of 0 to 7). The zero-detecting signal generator 52 includes eight 2-input NAND gates 56-0 to 56-7, an 8-input NAND gate 57, and a selector (SEL) 58. The output signal from the OR gate 55-i in the zero digit detector 51 is connected to one of the inputs of the NAND gate 56-i (i is any of 0 to 7). Of the 8-bit digit data RZ1, the ith bit (bit i) is connected to the other input of the NAND gate 56-i. The digit data RZ1 designates the digits to be zero detected, for example, the effective data digits of the output data Y from the 8-digit decimal adder/subtracter 20. The output signals from the NAND gates 56-0 to 56-7 are supplied to the NAND gate 57. The output signal from the NAND gate 57 is used as the zero detecting signal Z. The zero detecting signal Z indicates whether or not, of the data Y, the digits designated by the digit data RZ1 are all 0's.

The output signals from the OR gates 55-0 to 55-7 are also supplied to a selector (SEL) 58. The selector 58 selects one of the output signals from the OR gates 55-0 to 55-7 according to the 3-bit digit data RZ2. The data RZ2 designates the zero detection at one digit of the output data Y from the 8-digit decimal adder/subtracter 20, for example, at the digit by one digit higher in significance than the effective most significant digit. The output signal from the selector 58 is used as the zero detecting signal DGZ.

In the bit sliced decimal adding/subtracting unit shown in FIG. 1, the linked data containing signals TALL, ZONE, OLA0, and OLA1, is coupled with an address port AD in a ROM 60. The digit data RZ1 are previously stored in the addresses, corresponding to the linked data of the signals TALL, ZONE, OLA0, and OLA1. The ROM 60 is accessed by the linked data of the signals TALL, ZONE, OLA0, and OLA1. The digit data RZ1 from the ROM 60 is supplied to the zero-detecting signal generator 52, as described above. The signal TALL designates whether or not the digits of the output data Y from the 8-digit decimal adder/subtracter 20 should be subjected to the zero detecting. The signals OLA0 and OLA1 represent, respectively, the upper bit and the lower bit of the byte position data BPL of 2 bits, which represent a byte position where the effective least significant digit of each of the operands A and B is placed. Table 1 shows relationships of the input and the output of the ROM 60, that is, the linked data of the signals TALL, ZONE, OLA0, and OLA1 and the digit data RZ1.

TABLE 1

| TALL | ZONE | OLA0 | OLA1 | RZ1<br>0 1 2 3 4 5 6 7 |
|---|---|---|---|---|
| 1 | 0 | — | — | 1 1 1 1 1 1 1 1 |
| 1 | 1 | — | — | 0 1 0 1 0 1 0 1 |
| 0 | 0 | 0 | 0 | 1 0 0 0 0 0 0 0 |
| 0 | 0 | 0 | 1 | 1 1 1 0 0 0 0 0 |
| 0 | 0 | 1 | 0 | 1 1 1 1 1 0 0 0 |
| 0 | 0 | 1 | 1 | 1 1 1 1 1 1 1 0 |
| 0 | 1 | 0 | 0 | 0 1 0 0 0 0 0 0 |
| 0 | 1 | 0 | 1 | 0 1 0 1 0 0 0 0 |
| 0 | 1 | 1 | 0 | 0 1 0 1 0 1 0 0 |
| 0 | 1 | 1 | 1 | 0 1 0 1 0 1 0 1 |

The operation of the above-mentioned embodiment will be described. Description will first be given on the 4-byte operand to be operated by the bit sliced decimal adding/subtracting unit shown in FIG. 1. In this embodiment, the effective least significant digit of the operand is not always placed at the seventh digit (least significant digit) of the input to the 8-digit decimal adder/subtracter 20. If the effective least significant digit of the operand is not placed at the seventh digit of the input to the 8-digit decimal adder/subtracter 20, it is necessary to set at 0's all the digits lower than the effective least significant digit of the operand. Otherwise, even if the carry input CI (CI7), at the time of addition, is logical "0", the result of the operation may contain 1 added thereto. Alternately, if the carry input CI (CI7) is logical "1" at the time of subtraction, the operation result obtained may be by 1 smaller than the correct result of operation. This processing is executed by a data check circuit (not shown). More specifically, the bytes lower than that at the byte position where the effective least significant digit of the operand is placed, are all set at 0's. If the operand is of the pack format, the lower four bits of the sign data (1 byte), i.e., the sign S, are also set at "0". The bytes higher than that at the byte position where the effective most significant digit of the operand is placed are all set at 0's. The above operation has widely been employed in the operation of the pack format decimal numbers.

In this embodiment, when the operand has the zone format shown in FIG. 5, the upper four bits of each byte, or the entire zone field, are all rendered "0". The sign data SDn (of the zone format decimal number) is converted to data consisting of four 0 bits and the absolute value D (4 bits) of the decimal number represented by the data SDn.

The operands A and B supplied to the bit sliced decimal adding/subtracting unit shown in FIG. 1 are those already subjected to the above data conversion. The data conversion is executed according to the signal ZONE, the byte position data BPU, the byte position data BPL, and a signal F. The signal F indicates whether the operand to be data converted is the data containing the least significant digit of the variable length data to be operated (F=1) or not (F=0). The data conversion logic in this embodiment is shown in Table 2. In the table, sign "—" indicates "not data converted".

TABLE 2 - (1)

| ZONE | BPU | BPL | F | \multicolumn{8}{c}{DIGIT NO.} |
|------|-----|-----|---|---|---|---|---|---|---|---|---|
|      |     |     |   | 0 | 1 | 2 | 3 | 4 | 5 | 6 | 7 |
| 0 | 00 | 00 | 1 | — | 0 | 0 | 0 | 0 | 0 | 0 | 0 |
|   | 00 | 01 | 1 | — | — | — | 0 | 0 | 0 | 0 | 0 |
|   | 00 | 10 | 1 | — | — | — | — | — | 0 | 0 | 0 |
|   | 00 | 11 | 0 | — | — | — | — | — | — | — | — |
|   |    |    | 1 | — | — | — | — | — | — | — | 0 |
|   | 01 | 01 | 1 | 0 | 0 | — | 0 | 0 | 0 | 0 | 0 |
|   | 01 | 10 | 1 | 0 | 0 | — | — | — | 0 | 0 | 0 |
|   | 01 | 11 | 0 | 0 | 0 | — | — | — | — | — | — |
|   |    |    | 1 | 0 | 0 | — | — | — | — | — | 0 |
|   | 10 | 10 | 1 | 0 | 0 | 0 | 0 | — | 0 | 0 | 0 |
|   | 10 | 11 | 0 | 0 | 0 | 0 | 0 | — | — | — | — |
|   |    |    | 1 | 0 | 0 | 0 | 0 | — | — | — | 0 |
|   | 11 | 11 | 0 | 0 | 0 | 0 | 0 | 0 | 0 | — | — |
|   |    |    | 1 | 0 | 0 | 0 | 0 | 0 | 0 | — | 0 |

TABLE 2 - (2)

| ZONE | BPU | BPL | F | 0 | 1 | 2 | 3 | 4 | 5 | 6 | 7 |
|------|-----|-----|---|---|---|---|---|---|---|---|---|
| 1 | 00 | 00 | 1 | 0 | D | 0 | 0 | 0 | 0 | 0 | 0 |
|   | 00 | 01 | 1 | 0 | — | 0 | D | 0 | 0 | 0 | 0 |
|   | 00 | 10 | 1 | 0 | — | 0 | — | 0 | D | 0 | 0 |
|   | 00 | 11 | 0 | 0 | — | 0 | — | 0 | — | 0 | — |
|   |    |    | 1 | 0 | — | 0 | — | 0 | — | 0 | D |
|   | 01 | 01 | 1 | 0 | 0 | 0 | D | 0 | 0 | 0 | 0 |
|   | 01 | 10 | 1 | 0 | 0 | 0 | — | 0 | D | 0 | 0 |
|   | 01 | 11 | 0 | 0 | 0 | 0 | — | 0 | — | 0 | — |
|   |    |    | 1 | 0 | 0 | 0 | — | 0 | — | 0 | D |
|   | 10 | 10 | 1 | 0 | 0 | 0 | 0 | 0 | D | 0 | 0 |
|   | 10 | 11 | 0 | 0 | 0 | 0 | 0 | 0 | — | 0 | — |
|   |    |    | 1 | 0 | 0 | 0 | 0 | 0 | — | 0 | D |
|   | 11 | 11 | 0 | 0 | 0 | 0 | 0 | 0 | 0 | 0 | — |
|   |    |    | 1 | 0 | 0 | 0 | 0 | 0 | 0 | 0 | D |

TABLE 3

| M | ZONE1 | OS1 | OS2 |
|---|-------|-----|-----|
| 0 | 0 | 0110($6_H$) | 0110($6_H$) |
|   | 1 | 1111($F_H$) | 0110($6_H$) |
| 1 | — | 0000($O_H$) | 0000($O_H$) |
| 2 | — | 0000($O_H$) | 0000($O_H$) |

The operation of the offset data generator 30 will be given below. The operation mode data M of 2 bits is supplied to the NOR gate 31 in the offset data generator 30. The NOR gate 31 produces an output signal of logical 1 when the operation mode data M is 0 ("00"), i.e., the addition mode is designated by the operation mode data M. On the other hand, when the operation mode data M is not 0, i.e., it is set in any other mode than the addition mode, the NOR gate 31 produces an output signal of logical 0. The output signal from the NOR gate 31 is used for the bits 1 and 2 of the offset data OS1 and OS2. The bits 0 and 3 of the offset data OS2 is always "0". Accordingly, the offset data OS2 generated by the offset data generator 30 is "0110", i.e., $6_H$, in the addition mode. It is "0000", i.e., $O_H$, in any other mode than the addition mode.

The output signal from the NOR gate 31, together with the signal ZONE, is supplied to the AND gate 32. The AND gate 32 produces a logical 1 signal only when the output signal from the NOR gate 31 and the signal ZONE are both logical 1, that is, the addition mode is specified by the operation mode data M and the zone format is designated by the signal ZONE. The output signal from the AND gate 32 is used for the bits 0 and 3 of the offset data OS1. The output signal from the NOR gate 31 is used for the bits 1 and 2 of the offset data OS1. The offset data OS1 generated by the offset data generator 30 is "0110" or $6_H$, when the addition mode and the pack format are specified, and is "1111" when the addition mode and the zone format are specified. The offset data OS1 is "0000" in any other mode than the addition mode without regards to the data format. The offset data generating logic in the offset data generator 30 is tabulated in Table 3.

A basic operation of the adder/subtracter ASi (i is any of 0 to 7), shown in FIG. 3, will be given using cases where the operation mode data M is 0, 1 and 2.

(a) M=0 (addition mode)

The ith digit Ai of the operand A is supplied to the input A of the adder 21 in the adder/subtracter ASi, and the offset data OS is supplied to the input B thereof. The adder 21 adds the offset data OS to the ith digit Ai. The result of the addition Ai+OS by the adder 21 is supplied to the input A of the adder/subtracter 22. The ith digit Bi of the operand B is supplied to the input B of the adder/subtracter 22. The carry input CIi is supplied to the adder/subtracter 22. The adder/subtracter 22 conducts the addition of Ai+OS to Bi. The addition result by the adder/subtracter 22 is $$Ai+OS+Bi+Ci.$$

Sign "+" indicates a binary addition. The adder/subtracter 22 produces a carry output COi of logical 1 when $$Ai+OS+Bi+CIi \geq 16.$$

It is assumed now that i is an odd number (i is any of 1, 3, 5 and 7). The offset data OS2 is supplied as the offset data OS from the offset data generator 30 to the input OS of the adder/subtracter ASi. The offset data OS2 depends only on the operation mode data M, as seen from FIG. 6 and Table 3. When M=0, that is, in the addition mode, as in this embodiment, the offset data OS2 is $6_H$. Accordingly, the adder/subtracter 22 produces a carry output COi of logical 1, when $$Ai+Bi+CIi \geq 10.$$

According to the present embodiment, when the addition mode is specified by the operation mode data M, the adder/subtracter ASi (i is an odd number) for one odd numbered digit can correctly propagate a carry for the one digit decimal addition, when $6_H$ is applied as the offset data OS (OS2) to the input OS.

It is assumed that i is an even number (i is any of 0, 2, 4 and 6) The offset data OS1 is supplied as the offset data OS from the offset data generator 30 to the input OS of the adder/subtracter ASi. When M=0 as in this embodiment, the offset data OS1 is $6_H$ as in the case that i is an odd number, if ZONE=0 (pack format designation), as seen from FIG. 6 and Table 3.

Accordingly, if the addition mode is designated by the operation mode data M, and if the pack format is designated by the signal ZONE, the adder/subtracter ASi (i is an even number) can effect a correct carry propagation for the one digit decimal addition, when $6_H$ is applied as the offset data OS (OS1) to the input OS.

On the other hand, when ZONE=1 (zone format designation), the offset data OS1 is $F_H$ unlike the case of the odd number i. The odd number digit of the zone format decimal number, or the zone field, is set at "0" as described above. The sign data SDn is converted into data consisting of four 0 bits and the absolute value D (4 bits) of the decimal number represented by the data SDn. The all zero data is placed at the even digit. That is, the even digits Ail and Bi (i is an even number) of the operands A and B are "0". Accordingly, when the addition mode is designated by the operation mode data M, and the zone format is designated by the signal ZONE, the output data, Ai+OS+Bi+CIi, of the adder/subtracter 22 in the adder/subtracter ASi (i is an even number) for the even digits is rewritten into $$F_H + CIi.$$

The adder/subtracter 22 produces a carry output COi of logical 1 when $$F_H + CIi \geq 16,$$

that is, CIi=1. The adder/subtracter 22 produces a carry output COi of logical 0 when $$F_H + CIi < 16,$$

that is, CIi=0. Accordingly, in the present embodiment, if the addition mode is designated by the operation mode data M, and the zone format is designated by the signal ZONE, the adder/subtracter ASi (i is an even number) for one even digit can propagate the carry input CIi as the carry output COi (the carry input CIi−1 to the succeeding upper digit) as intact by supplying $F_H$ as the offset data OS (OS1) to the OS input. In other words, a carry propagation is possible among the odd number digits where the decimal numbers are actually placed in the zone format decimal number.

The carry output COi from the adder/subtracter 22 in the adder/subtracter ASi is also supplied to the correction data generator 23. The correction data generator 23 generates a correction data $O_H$ when the carry output COi is logical 1, and generates a correction data $A_H$ when the carry output COi is logical 0. The correction data generated by the correction data generator 23 is supplied to the input B of the adder 24. Applied to the input A of the adder 24 is the output data, Ai+OS+Bi+CIi, of the adder/subtracter 22. The adder 24 adds the correction data from the correction data generator 23 to the output data Ai+OS+Bi+CIi, thereby to produce data Yi. The data Yi, when COi=1, is $$Yi = Ai + OS + Bi + CIi$$

and, when COi=1, is $$Yi = Ai + OS + Bi + CIi + A_H.$$

The reason why $A_H$ is applied to Ai+OS+Bi+CIi when COi=0, is that the offset data must be cancelled. This is due to the fact that when i is an odd number or even when i is an even number, if ZONE=0, the offset data OS (OS1, OS2) of the numeral $6_H$ for correcting the carry output has been added to the operand. In this embodiment, by the adder 24, $A_H$ is added to the output data, Ai+OS+Bi +CIi, of the adder/subtracter 22, thereby to cancel the offset data OS of the numeral $6_H$. Through this addition, it is treated as if $F_H$ is added thereto. In this way, the circuit operates as if nothing is added thereto. When i is an even number, and ZONE=1, $F_H$ is used as the offset data OS (OS1). Therefore, even if the $A_H$ is used as the correction data, the proper correction of the operation result is impossible.

However, when ZONE=1, the even digits are in the zone fields. Accordingly, no problems arise.

(b) M=1 (subtraction mode is specified)
The adder/subtracter 22 in the adder/subtracter ASi produces a carry output COi of logical 1 if $$Ai + OS + \overline{Bi} + CIi \geq 16.$$

It produces a carry output COi of logical 1 if $$Ai + OS + \overline{Bi} + CIi < 16.$$

In this case, the offset data OS (OS1, OS2) is $O_H$ irrespective of a logical state of the signal ZONE. When i is an even number and ZONE=1, Ai=Bi=0. In this case, the adder/subtracter 22 produces a carry output COi of logical 1 when CIi=1. It produces a carry output COi of logical 0 when CIi=0. Accordingly, in the present embodiment, when the subtraction mode is specified by the operation mode data M, and the zone format is specified by the signal ZONE, the adder/subtracter ASi (i is an even number) for one even digit can propagate the carry input CIi as the carry output COi (the carry input CIi−1 to the succeeding upper digit) as intact, when $O_H$ is applied as the offset data OS (OS1) to the OS input. In other words, carry propagation is possible among the odd digits where the decimal numbers are actually placed in the zone format decimal number.

In the subtraction mode, the data Yi is $$Yi = Ai\ OS + \overline{Bi} + CIi$$

when COi=1. It is $$Yi = Ai + OS + \overline{Bi} + CIi + A_H$$

when COi=0.

(c) M=2 (left-side-input-through mode)
The output data Ai+OS+Bi+CIi of the adder/subtracter 22 in the adder/subtracter ASi is Ai+CIi since Bi=OS=$O_H$. Further, since Ai<10, then Ai+CIi°16. The carry input CI (CI17) is logical 0. Therefore, the output data from the adder/subtracter 22 in the adder/subtracter ASi is Ai, and the carry output COi, or the carry input CIi−1, is logical 0. When M=2, the adder 24 in the adder/subtracter ASi is set to the left-side-input-through mode. Accordingly, the output data Yi from the adder 24 is Ai irrespective of the correction data from the correction data generator 23.

The basic operation of the 1-digit decimal adder/subtracter ASi (i is any of 0 to 7) is as mentioned above.

The operation of the bit sliced decimal adding/subtracting unit, shown in FIG. 1, will be described using an addition of decimal numbers in the pack format. Assume now that the operand A is "00865400", and the operand B is "00065430". It is further assumed that the byte position of the effective most significant digit of each of the operands A and B is 1 ("01"), that is, BPU=1, and the byte position of the effective least significant digit is 3 ("11"), that is, BPL=3. In the case of the addition of the pack format decimal numbers, when ZONE=0 and M=0, the offset data OS1 and OS2 are each $6_H$, as shown in Table 3. Therefore, the output data Ai+OS+Bi+Ci of the adder/subtracter 22 in each adder/subtracter ASi (i is any of 0 to 7) and the carry output COi are as given below.

| Ai: | 0 | 0 | 8 | 6 | 5 | 4 | 0 | 0 |
|---|---|---|---|---|---|---|---|---|
| OS: | 6 | 6 | 6 | 6 | 6 | 6 | 6 | 6 |

-continued

| Bi:    | 0 | 0 | 0  | 6  | 5  | 4  | 3 | 0 |
|--------|---|---|----|----|----|----|---|---|
| + CIi: | 0 | 0 | 1  | 1  | 0  | 0  | 0 | 0 |
|        | 6 | 6 | 15 | 19 | 16 | 14 | 9 | 6 |
| COi:   | 0 | 0 | 0  | 1  | 1  | 0  | 0 | 0 |

The output data Yi(Ai+OS+Bi+CIi or Ai+OS+Bi+CIi+A$_H$) of the adder 24 in the adder/subtracter ASi (i is any of 0 to 7) is

|     | 6  | 6  | 15 | 19 | 16 | 14 | 9  | 6  |
|-----|----|----|----|----|----|----|----|----|
| +   | 10 | 10 | 10 | 0  | 0  | 10 | 10 | 10 |
|     | 16 | 16 | 25 | 19 | 16 | 24 | 19 | 16 |
|     | ↓  | ↓  | ↓  | ↓  | ↓  | ↓  | ↓  | ↓  |
| Yi: | 0  | 0  | 9  | 3  | 0  | 8  | 3  | 0. |

The carry output COi from the adder/subtracter 22 in each adder/subtracter Asi (i is any of 0 to 7), that is, the carry outputs CO0 to CO7 from the adder/subtracters AS0 to AS7, is supplied to the selector 40. The selector 40 selects one of the carry outputs CO0 to CO7 in accordance with the digit position data EMSDP. In this embodiment, where ZONE=0 and BPU=1 ("01"), EMSDP=2 ("010"). In this case, the selector 40 selects the carry output CO2 from the adder/subtracter AS2 for the second digit as the carry output CO of the bit sliced decimal adding/subtracting unit shown in FIG. 1.

The output data Yi from each adder/subtracter ASi (i is any of 0 to 7), i.e., the output data Y0 to Y7 from the adder/subtracters AS0 to AS7, is supplied to the OR gates 55-0 to 55-7 constituting the zero digit detector 51 in the zero-detecting circuit 50. The OR gates 55-0 to 55-7 produce signals of logical 1 only when the data Y0 to Y7 are zero. Thus, the OR gates 55-0 to 55-7 detect zeroes of the data Y0 to Y7.

The output signals from the OR gates 55-0 to 55-7 are supplied to first input terminals of the NAND gates 56-0 to 56-7 in the zero-detecting signal generator 52, respectively. The 0th to 7th bits of the 2-bit digit data RZ1 are supplied to the other input terminals of the NAND gates 56-0 to 56-7. The digit data RZ1 is supplied from the ROM 60. In this embodiment where ZONE=0 and BPL=3 (i.e., OLA0=OLA1=1), the "11111110" is read out from the ROM 60, as the digit data RZ1. The NAND gate 56-i (i is any of 0 to 7) produces a signal of logical 1 irrespective of the output signal from the OR gate 55-i when the ith bit of the digit data RZ1 is logical 0. In other words, when the ith bit of the digit data RZ1 is logical 0, the zero detection by the OR gate 55-i is masked. On the contrary, when the ith bit of the digit data RZ1 is logical 1, the NAND gate 56-i inverts the logical level of the output signal of the OR gate 55-i. The output signals from the NAND gates 56-0 to 56-7 are supplied to the NAND gate 57. The NAND gate 57 produces a zero-detecting signal Z of logical 1 only when the output signals from the NAND gates 56-0 to 56-7 are all logical 1. The zero-detecting signal Z of logical 1 indicates that the output data at the digits as specified by the digit data RZ1 are all 0's. In this embodiment since the output data Y from the 8-digit decimal adder/subtracter 20 is "00930830", the zero-detecting signal Z is logical 0.

The output signals from the OR gates 55-0 to 55-7 are also supplied to the selector (SEL) 58. The selector 58 selects one of the output signals from the OR gates 55-0 to 55-7 in accordance with the digit data RZ2 of 3 bits. The digit data RZ2 designates the zero detection at the digit by one digit upper than the effective most significant digit of each of the operands A and B. In this embodiment, the effective most significant digit of each of the operands A and B is the second digit. Accordingly, the digit data RZ2 is 1 ("001"). The selector 58 selects, as the zero-detecting signal DGZ, the output signal from the OR gate 55-1, i.e., the zero detecting result of the output data Y1, when RZ2=1. In this embodiment, since Y1=0, the zero-detecting signal DGZ is logical 0. The zero-detecting signal DGZ of logical 0 indicates that no overflow occurs in the operation of the operands A and B. Presence or not of the overflow occurence is checked by the carry output CO selected by the selector 40. The zero-detecting signal DGZ is used to detect whether or not such an overflow occurs, when the number of the effective digits of the pack format decimal numbers is even.

The addition of the zone format decimal numbers will be explained. It is assumed now that the operand A is "01020300" and the operand B is "07070700". The byte position of the effective most significant digit of each of the operands A and B is 0 ("00"), i.e., BPU=0, and the byte position of the effective least significant digit is 2 ("10"), i.e., BPL=2. In the addition of the zone format decimal numbers, the offset data OS1 and OS2 are 15 ($F_H$) and 6, as shown in Table 5. Accordingly, the output data Ai+OS+Bi+Ci of the adder/subtracter 22 in each adder/subtracter ASi (i is any of 0 to 7) and the carry output COi are as follows:

| Ai:    | 0  | 1  | 0  | 2  | 0  | 3  | 0  | 0  |
|--------|----|----|----|----|----|----|----|----|
| OS:    | 15 | 6  | 15 | 6  | 15 | 6  | 15 | 6  |
| Bi:    | 0  | 7  | 0  | 7  | 0  | 7  | 0  | 0  |
| + CIi: | 0  | 1  | 1  | 1  | 1  | 0  | 0  | 0  |
|        | 15 | 15 | 16 | 16 | 16 | 16 | 15 | 6  |
| COi:   | 0  | 0  | 1  | 1  | 1  | 1  | 0  | 0. |

The output data Yi(Ai+OS+Bi+CIi or Ai+OS+Bi+CIi+A$_H$) of the adder 24 in each adder/subtracter ASi (i is any of 0 to 7) is

|     | 15 | 15 | 16 | 16 | 16 | 16 | 15 | 6  |
|-----|----|----|----|----|----|----|----|----|
| +   | 10 | 10 | 0  | 0  | 0  | 0  | 10 | 10 |
|     | 25 | 25 | 16 | 16 | 16 | 16 | 25 | 16 |
|     | ↓  | ↓  | ↓  | ↓  | ↓  | ↓  | ↓  | ↓  |
| Yi: | 9  | 9  | 0  | 0  | 0  | 0  | 9  | 0. |

Of the data Yi (i is any of 0 to 7), the digits for numerical values are underlined. The digits of the data corresponding to the zone fields are not underlined. As seen from the above embodiment, the offset data OS (OSI) of a numerical value 15 ($F_H$) is applied to the adder/subtracters AS0, AS2, AS4 and AS6 which perform the operation on the digits corresponding to the zone fields, so that the carry propagation is correctly carried out. The digits corresponding to the zone fields of each operand A and B have been preset to 0, as mentioned above, but the digits corresponding to the zone fields of the operation result Y are not necessarily 0. Nevertheless, this does not cause any problem.

The subtraction of the zone format decimal number will be described. It is assumed that the operand A is "01000000" and the operand B is "00000100". The byte positions of the effective most signigicant digit of each operand A and B is 0 ("00"), i.e., BPU=2, and the byte position of the effective least significant digit is 2 ("10"), i.e., BPL=2. In the subtraction mode, i.e., M=1, the offset data OS1 and OS2 are both 0, as shown in Table 3. Accordingly, the output data $A_i+OS+B_i+C_i$ of the adder/subtracter 22 in each adder/subtracter ASi (i is any of 0 to 7) and the carry output $CO_i$ are as follows:

| $A_i$:   | 0  | 1  | 0  | 0  | 0  | 0  | 0  | 0  |
|----------|----|----|----|----|----|----|----|----|
| OS:      | 0  | 0  | 0  | 0  | 0  | 0  | 0  | 0  |
| $B_i$:   | 15 | 15 | 15 | 15 | 15 | 14 | 15 | 15 |
| $+ CI_i$:| 1  | 0  | 0  | 0  | 0  | 1  | 1  | 1  |
|          | 16 | 16 | 15 | 15 | 15 | 15 | 16 | 16 |
| $CO_i$:  | 1  | 1  | 0  | 0  | 0  | 0  | 1  | 1  |

The output data $Y_i(A_i+OS+E,\text{ovs}/B_i/+CI_i$ or $A_i+OS+E,\text{ovs}/B_i/+CI_i+A_H)$ of the adder 24 in each adder/subtracter Asi (i is any of 0 to 7) is

|   | 16 | 16 | 15 | 15 | 15 | 15 | 16 | 16 |
|---|----|----|----|----|----|----|----|----|
| + | 0  | 0  | 10 | 10 | 10 | 10 | 0  | 0  |
|   | 16 | 16 | 25 | 25 | 25 | 25 | 16 | 16 |
|   | ↓  | ↓  | ↓  | ↓  | ↓  | ↓  | ↓  | ↓  |
| $Y_i$: | 0 | 0 | 9 | 9 | 9 | 9 | 0 | 0. |

The carry outputs CO0 to CO7 of the adder/subtracters AS0 to AS7 are supplied to the selector 40. The selector 40 selects one of the carry outputs CO0 to CO7 according to the digit position data EMSDP. In this embodiment where ZONE=1 and BPU=0 ("00"), EMSDP=1 ("001"). In this case, the selector 40 selects the carry output COI (=1) from the first digit adder/subtracter AS1, as the carry output CO of the bit sliced decimal adding/subtracting unit of FIG. 1. The carry output CO in the subtraction mode indicates whether the subtraction result in the bit sliced decimal adding/subtracting unit is negative or not. In this embodiment, the carry output CO is logical 1 and it shows that the result of subtraction is positive.

The output data Y0-Y7 from the adder/subtracters AS0 to AS7 are supplied to the zero digit detector 51 of the zero-detecting circuit 50. The zero digit detector 51 performs the zero detection of the data Y0 -Y7. The zero detection result by the zero digit detector 51 is supplied to the zero-detecting signal generator 52. The zero-detecting signal generator 52 checks whether the digits specified by the digit data RZ1 from the ROM 60 are all 0's or not, and produces a zero-detecting signal Z representing the result of the check. The digit data RZ1 supplied from the ROM 60 is "010101000", as shown in Table 1, as in this embodiment where ZONE=1 and BPL=2 (OLA0=1 and OLA1=0). In this case, the zero-detecting signal generator 52 produces a zero-detecting signal Z according to the result of the zero detection of the data Y1, Y3 and Y5 in the zero digit detector 51. Thus, neglected is the zero detection result of the data Y0, Y2 and Y4 corresponding to the zone fields, and the data Y6 and Y7 lower in significance than the effective least significant digit.

When the substraction result by the bit sliced decimal adding/subtracting unit is negative, the data Y is expressed by the complement of 10. In this case, if the subtraction is performed with the data Y for the operand B and the zero data for the operand A, the result is expressed by the complement of 10. This means that the data Y is converted into an usual decimal number. Even in the adding operation as conducted under a condition that the data obtained by inverting the logical states 0 and 1 of the data Y is used for the operand A, and the zero data is for the operand B, the data Y can also be converted into the decimal number.

While the present invention has been described using a specific embodiment, the present invention is not limited to such a specific embodiment, but may variously be modified and changed within the scope of the present invention. For example, the byte position data BPU is used for a part of the address of the ROM 60. In this case, the digit data RZ1 for excluding the digits higher than the effective most significant digit from the zero detection digits, may be read out of the ROM 60. In this case, there is no need to change to 0's the digits higher than the effective most significant digit of the operand to be operated.

What is claimed is:

1. A bit sliced decimal adding/subtracting unit comprising:
   an n-digit decimal adder/subtracter including n1-digit decimal adder/subtracters (n is an even number) with offset inputs, which are intercoupled so as to allow a carry to propagate from the lower order digit to the higher order digit;
   first means for generating first offset data in accordance with first control data for specifying an operation mode of said n-digit decimal adder/subtracter, and with second control data indicating whether the data format of the data to be operated by said n-digit decimal adder/subtracter is of the pack format or of the zone format, and for supplying said offset data to said offset inputs of the adder/subtracters at the even number digits (where the most significant digit is the 0th digit and the least significant digit is the (n−1)th digit) of said n1-digit decimal adder/subtracters of; and
   second means for generating second offset data in accordance with said first control data, and for supplying said second offset data to said offset inputs of the adder/subtracters at odd number digits of said n1-digit decimal adder/subtracters of.

2. A bit sliced decimal adding/subtracting unit according to claim 1, in which said first means generates a hexadecimal number 6 as said first offset data when an addition mode is specified by said first control data and the pack format is specified by said second control data, generates a hexadecimal number F as said first offset data when the addition mode is specified by said first control data and the zone format is specified by said second control data, and generates a hexadecimal number 0 as said first offset data without regards to said second control data when an operation mode other than the addition mode is specified by said first control data.

3. A bit sliced decimal adding/subtracting unit according to claim 2, in which said second means generates a hexadecimal number 6 as said second offset data when the addition mode is specified by said first control data, and generates a hexadecimal number 0 as said second offset data when an operation mode other than the addition mode is specified by said first control data.

4. A bit sliced decimal adding/subtracting unit according to claim 3, further comprising third means for selecting one of carries from said n1-digit decimal adder/subtracters in accordance with third control data representing the effective most significant digit of the output data from said n-digit decimal adder/subtracter.

5. A bit sliced decimal adding/subtracting unit according to claim 4, in which said third control data is obtained by linking the byte position data of 2 bits representing a byte position of the effective most significant digit of the data to be operated on by said n-digit decimal adder/subtracter and said second control data.

* * * * *